Aug. 4, 1942.    S. T. SCHWARTZ    2,292,243
KILN CONTROL
Filed Oct. 1, 1940    5 Sheets-Sheet 1

Inventor
SIDNEY T. SCHWARTZ
By Raymond D. Junkins
Attorney

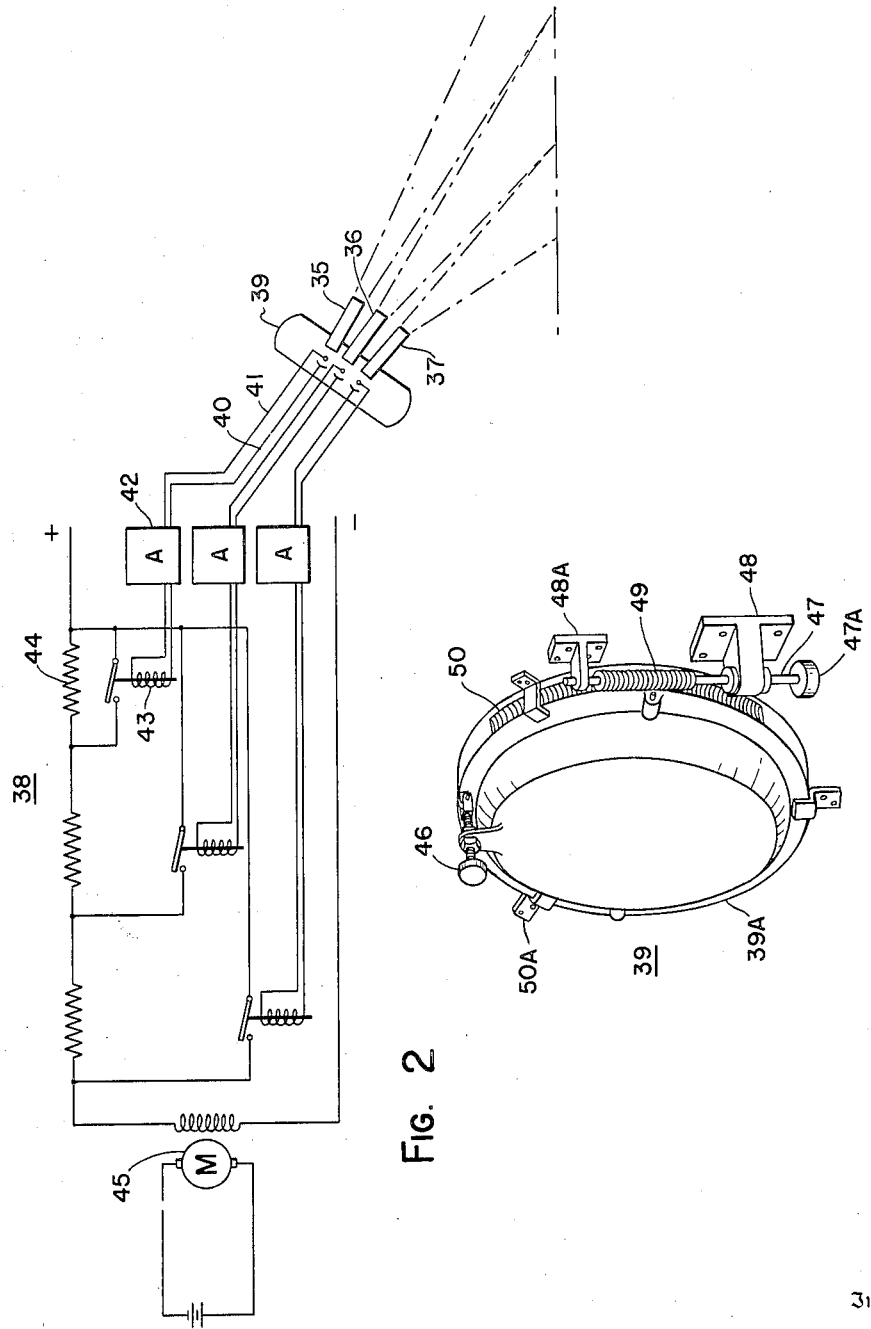

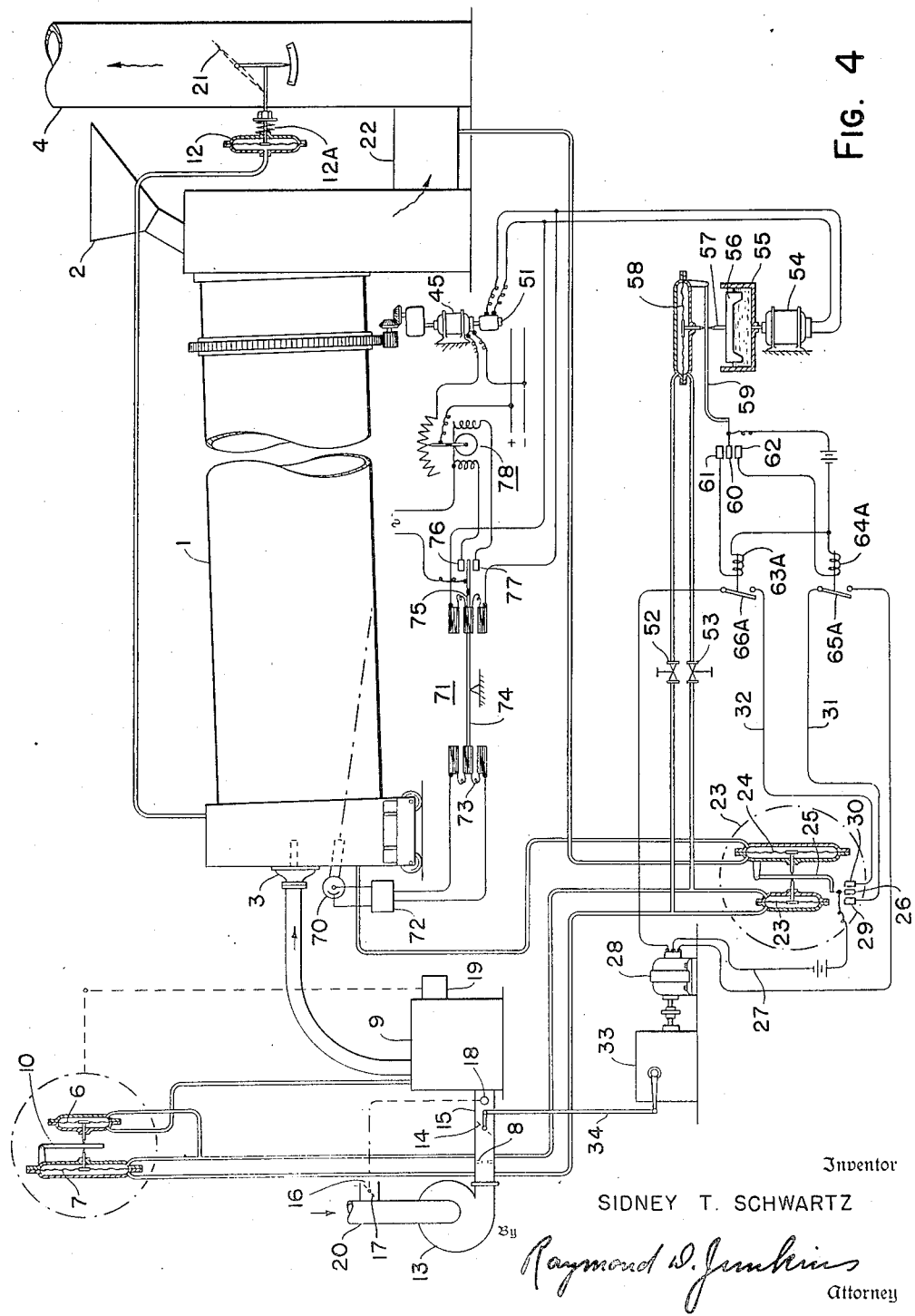

Aug. 4, 1942.   S. T. SCHWARTZ   2,292,243
KILN CONTROL
Filed Oct. 1, 1940   5 Sheets-Sheet 4

Inventor
SIDNEY T. SCHWARTZ
By Raymond W. Junkins
Attorney

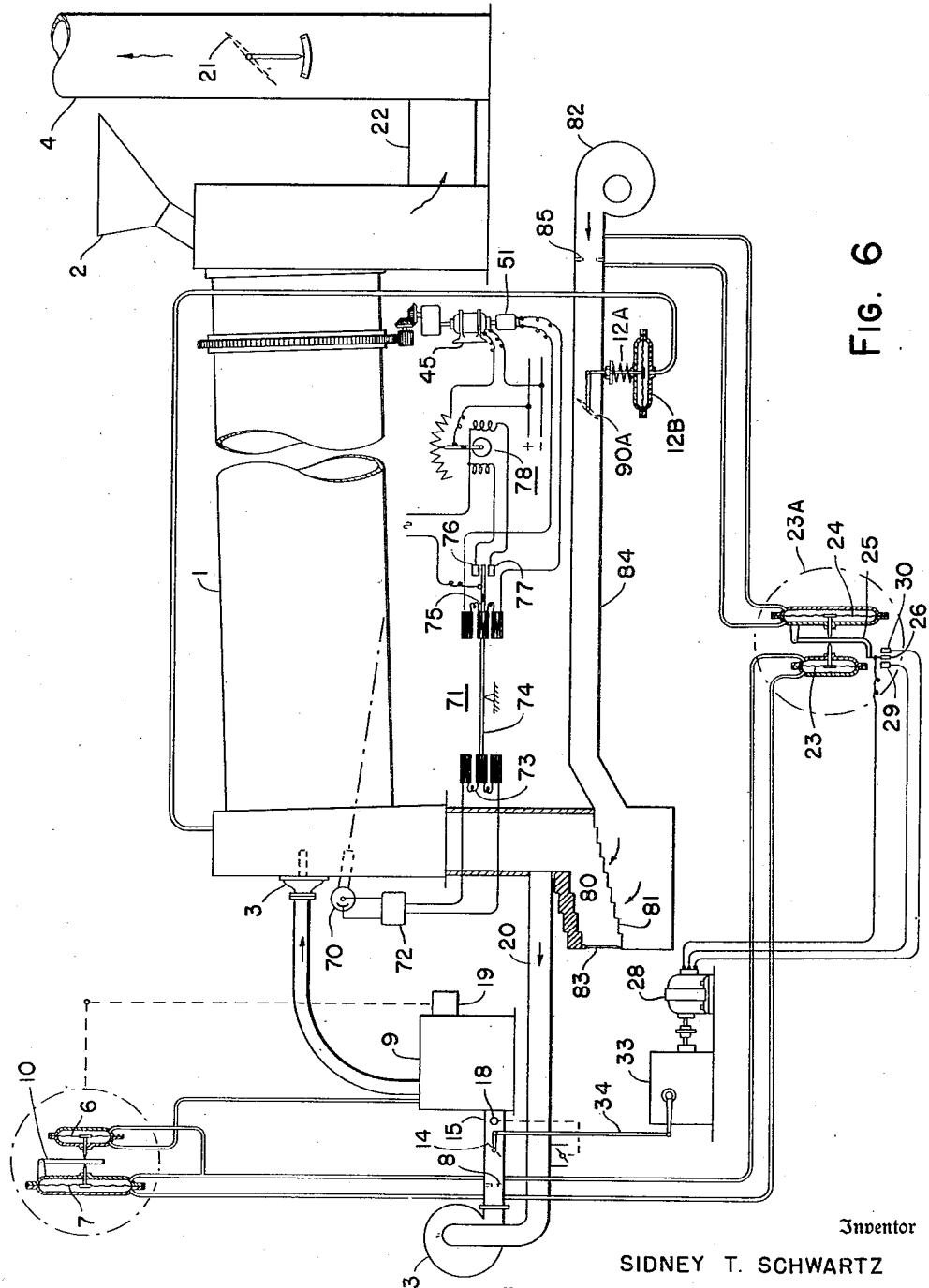

Patented Aug. 4, 1942

2,292,243

UNITED STATES PATENT OFFICE 2,292,243

KILN CONTROL

Sidney T. Schwartz, Ridgewood, N. J., assignor to The Babcock & Wilcox Company, Newark, N. J., a corporation of New Jersey Application October 1, 1940, Serial No. 359,197

26 Claims. (Cl. 263—32)

My invention relates to kiln control and more particularly to control for regulating rotary kilns in cement manufacturing plants.

In present day cement manufacturing plants inclined kilns of considerable length are provided to effect incipient vitrification or fusion of two materials, one material rich in lime, such as limestone or marl, known as calcareous material, and another material rich in silica, alumina and iron oxide, such as clay or shale, known as argillaceous material. A homogenous mixture of these materials is fed into the high end of a rotary kiln and during rotation of the kiln passes through the different zones thereof, known as dehydration zone, calcining zone, and clinkering or burning zone. At the end of the latter zone the cement clinker is discharged and cooled. The union of the materials within the kiln is effected by the application of heat, which in the usual arrangement is produced by a burner projecting into the lower end of the kiln and discharging combustible material therein. The final temperature at which incipient fusion takes place is of the order of 1500° C. It is desirable to maintain substantially constant temperature within the kiln because a considerable variation of the temperature lowers the quality of the cement clinker produced and also the efficiency of the kiln.

A principal object of my invention is to provide a kiln control arrangement which will produce a uniform, high quality clinker economically.

In accordance with my invention I maintain a predetermined ratio between the rates of fuel and air supply and vary the kiln speed in correspondence with changes in the character of the clinkering zone.

For a consideration of what I believe to be novel attention is directed to the following description and the claims appended thereto in connection with the accompanying drawings in which:

Fig. 2 is a diagrammatic representation of the circuit of the kiln speed control apparatus.

Fig. 3 is a detail of the housing for light sensitive elements.

Figs. 4, 5 and 6 illustrate modified forms of my invention.

Figure 1:
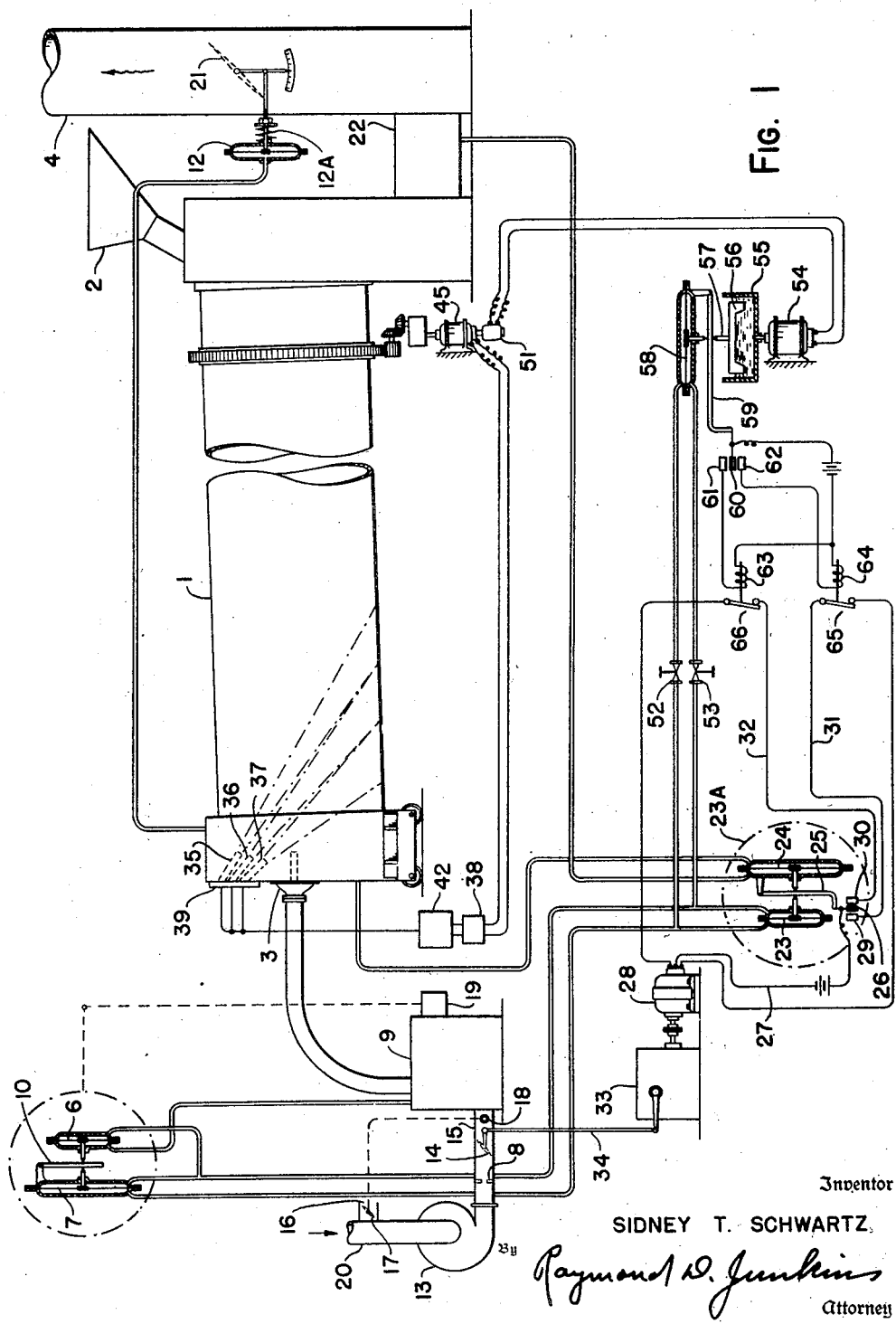
Fig. 1 is a schematic representation of my invention.

Secondary air for combustion, in the embodiment of my invention as shown in Fig. 1, enters the kiln 1 through suitable openings or ports (not shown) around the burner 3. My invention as illustrated in Fig. 1 is equally applicable to kilns provided with forced draft as will be evident to those skilled in the art; however in such cases I usually prefer to use the form of my invention shown in Fig. 5 or Fig. 6 for reasons which will be explained more in detail hereinafter.

Referring to Fig. 1, I therein show a rotary kiln 1 to which are adapted fuel feeding and control appurtenances. The raw material either dry or in a wet state, commonly known as "slurry," is fed into the kiln 1 at its high end through a funnel entrance 2. The rate of feed of the raw material may be maintained constant or in proportion to the speed of the kiln 1 by suitable feeding means (not shown), as will be readily understood by those familiar with the art. The fuel firing the kiln 1, in the embodiment shown pulverized coal, enters the kiln through a burner 3 from a pulverizer 9. The gases of combustion after passing through the kiln 1 are discharged through a duct 22 and stack 4 either to the atmosphere or to suitable heat recovery means such as a waste heat boiler (not shown).

A fan 13 supplies primary air for carrying the pulverized fuel from the pulverizer 9 to the burner 3. Preferably the primary air contains some preheat so that the fuel while being pulverized will be dried. In such instances where the primary air is preheated I may provide a tempering damper 16 for maintaining the degree of preheat at some predetermined value. The damper 16 may be automatically regulated from a suitable temperature sensitive device 18 to maintain the temperature of the primary air entering the pulverizer 9 at a predetermined value.

The primary air in passing through the pulverizer 9 picks up fine particles of fuel and carries them to the burner 3. The rate at which pulverized fuel leaves the pulverizer 9 is directly proportional to the rate at which primary air passes through the pulverizer. Accordingly, the rate at which fuel is supplied the kiln 1 may be controlled by regulating the rate at which primary air is supplied the pulverizer 9. In the duct 15 leading from the fan 13 to the pulverizer 9 I show a damper 14 which may be positioned to regulate the flow of primary air to the pulverizer 9, and accordingly the rate of fuel feed to the kiln 1.

The pulverizer 9 is supplied with raw coal by means of a suitable feeder diagrammatically shown at 19. I preferably regulate the feeder 19 to maintain a level of coal in the pulverizer 9 in accordance with the system shown and described in United States patent to Hardgrove 1,965,643. In accordance therewith the feed of material to the mill is controlled to maintain an amount of material in the mill proportional to the flow of primary air to the mill. In the specific embodiment shown I employ an orifice 8 in the duct 15 to obtain a measure of the primary air flow to the mill and utilize the differential in pressure existing across a portion of the pulverizer 9 to obtain a measure of the amount of material in the mill. The differential pressure produced by the orifice 8 is transmitted to a pressure sensitive diaphragm 7, which produces a force on a fulcrum lever 10 proportional to the rate of flow of primary air through the duct 15. The differential pressure across a selected portion of the mill 9 is impressed upon a pressure sensitive diaphragm 6, which acts to produce a force on the fulcrumed lever 10 proportional to the amount of coal in the mill and acting in opposition to the force produced by the diaphragm 7. The feeder 19 is controlled in accordance with the departure of the lever 10 from a neutral position to adjust the flow of raw coal to the pulverizer 9 to restore the lever 10 to the neutral position. I have for the sake of simplicity illustrated the connections between the lever 10 and feeder 19 schematically, it being understood that any suitable means, either electrical, mechanical or hydraulic, might be employed.

At 23A I illustrate a device for maintaining a predetermined ratio between the rate of air flow through the kiln 1 and available for combustion and the rate of fuel flow to the kiln. To obtain a measure of the rate of air flow I utilize the pressure drop or draft loss through the kiln 1 which is impressed upon a diaphragm 24. To obtain a measure of the rate of fuel supplied the kiln 1 I utilize the differential produced by the orifice 8, which as heretofore described bears a functional relation to the rate at which pulverized fuel is supplied the burner 3. The differential produced by the orifice 8 is impressed upon a diaphragm 23. The forces produced by the diaphragms 23 and 24 act in opposition to each other upon a fulcrumed lever 25 carrying a contact 26. The arrangement is such that upon an increase in the pressure drop through the kiln 1, indicating an increase in the rate of air flow therethrough, the lever 25 is positioned clockwise so that the contact 26 engages a contact 29 closing the circuit for a reversible motor 28, which through a suitable gear reduction 33 and link 34 positions the damper 14 in an opening direction, thereby effecting an increase in the rate of primary air flow to the mill 9 and a corresponding increase in the rate of pulverized fuel flow to the burner 3. As the rate of flow of primary air increases the differential pressure produced by the orifice 8 likewise increases, and when the increase in the rate of primary air flow (fuel flow) is proportional to the increase in differential across the kiln 1 (air flow) the lever 25 will be restored to the neutral position by virtue of the increase in force produced by the diaphragm 23. Conversely upon a decrease in air flow through the kiln 1 the lever 25 will be positioned in a counterclockwise direction so that the contact 26 engages a contact 30, thereby effecting operation of the motor 28 in a direction to decrease the flow of primary air, and hence the flow of fuel to the kiln. When the decrease in primary air is in proportion to the decrease in air flow through the kiln the lever 25 will be restored to the neutral position.

The ratio of air to fuel necessary for complete combustion of the latter may originally be determined by any suitable means such as an Orsat for sampling the flue gas. Having determined the correct ratio the device 23A may be adjusted so that thereafter the correct ratio will be automatically maintained. As will be readily understood by those familiar with the art suitable mechanical adjusting means may be incorporated in the device 23A so that any desired ratio may be maintained between rate of air flow and rate of fuel flow. For example, the ratio automatically maintained by the device 23A may readily be adjusted by positioning the pressure sensitive device comprising the diaphragm 23 longitudinally along the lever 25 relative to the position of the pressure sensitive device comprising the diaphragm 24.

Ordinarily a constant predetermined air flow is preferable through the kiln 1. In the stack 4 I show a damper 21 which may be adjusted to give the desired rate of air flow. The device 23A will act to establish a rate of fuel flow to the kiln 1 corresponding to the rate of air flow. Thereafter minor fluctuations in the rate of air flow through the kiln will effect immediate and proportionate changes in the rate of fuel flow by virtue of the device 23A, so that the correct ratio between fuel flow and air flow is maintained.

The damper 21 may be adjusted manually, or as I have shown it may be positioned automatically by a servo-motor 12, to maintain a constant predetermined draft in the hood of the kiln. An adjustable loading spring 12A is provided so that the servo-motor 12 may be set to maintain any draft desired in the hood of the kiln. As heretofore explained, secondary air for combustion, in the modification of my invention shown in Fig. 1, is drawn from the atmosphere through suitable openings around the burner 3. The amount of air so drawn will depend upon the draft in the hood; and accordingly the loading spring 12A affords a means of maintaining a predetermined air flow through the kiln, as by adjusting it to maintain a greater hood draft, for example, I adjust the control to maintain a greater air flow through the kiln. After such an adjustment the controller 23A will increase the rate of fuel feed to maintain the predetermined fuel-air ratio.

It is a recognized fact that to have good quality clinker the material in the kiln must pass through the burning zone at a predetermined temperature and be retained therein for a predetermined time. The primary function determining kiln speed is therefore the extent or area of the burning zone. If the burning zone is relatively short, then the kiln should be rotated at a correspondingly slower speed so that the length of time the clinker remains in the burning zone is substantially the same as if the burning zone was relatively long and the kiln rotated at a higher speed. The precise relationship between extent or area of the burning zone and kiln speed should, of course, be determined by experimentation and analysis of the clinker leaving the kiln. Having once determined the optimum relationship between the extent or area of the burning zone and kiln speed, my invention contemplates the provision of means for automatically maintaining such relationship.

Referring to Fig. 1, I maintain the previously determined relationship between clinkering zone and kiln speed by means of "electric eyes," that is, photo cells or radiation pyrometers, as generally indicated at 35, 36 and 37. For illustration purposes I show three in number focused on an area determined as the clinkering zone of the kiln. The number of "eyes" may be increased or decreased depending upon the size of the kiln and length of its clinkering zone and the coverage ability of the "eyes." As shown, each eye covers a certain area, so that all of the predetermined zone area is effectively covered. The control arrangement governed by the eyes 35, 36 and 37 is as follows:

Each eye is made responsive to a certain amount of light emanating from its portion of the clinkering zone. Eye 35 which is focused farthest in the kiln is so connected as to place the kiln speed controller 38 on the highest speed, and each interval or spot looked at by eyes 36, 37 has a correspondingly decreased speed on the controller. If the spot on which the eye 35 is focused is at the temperature at which incipient fusion of the clinker takes place, then the kiln controller will be at a position for highest speed. If, however, this spot is below this temperature, but the spot on which the photocell 36 is focused is at or above this temperature, then the controller will be adjusted to give a lower speed of the kiln 1. Similarly, if the spot on which the photo cell 36 is focused is not at a temperature to cause incipient fusion of the clinker, but the spot on which the photo cell 37 is focused is at or above this temperature, then the kiln 1 will be adjusted by means of the controller 38 to operate at a still lower speed.

Referring to the more detailed circuit arrangement illustrated in Fig. 2, it will be noted that the photo cells 35, 36 and 37 are housed in a common holder 39. To each cell are connected conductors such as indicated at 40, 41 carrying the current generated by each photo cell to a separate amplifier, such as indicated at 42. Each amplifier in turn controls a solenoid contact 43 which upon being energized will short circuit a resistance 44 in the field circuit of a direct current motor 45 driving the kiln. The arrangement is such that so long as the temperature of the spot upon which the photo cell is focused is above that producing incipient fusion of the clinker, the solenoid operated thereby remains open. As shown, the temperatures to which the photoelectric cells 35, 36 and 37 are sensitive are at or above the temperature producing incipient fusion of the clinker, so that the solenoids operated thereby are open, and accordingly the resistance of the field circuit of the motor 45 is at a maximum and the motor 45 rotates at maximum speed. If now the temperature to which the photo cell 35 is sensitive falls below the critical point, then the solenoid switch 43 will close, thereby causing the motor 45 to operate at a lower speed. Similar action occurs when the temperature to which the photoelectric devices 36 and 37 are sensitive falls below the critical point.

The particular type of motor 45 and the control circuit therefor which I have described should be taken merely as illustrative, as it is evident that I may employ any variable speed type of alternating or direct current motor and modify the control circuit as may be necessary for the particular type of motor employed.

Should chemical analysis in the clinker show insufficient burning the time thereof may be increased by moving the eyes forward in the kiln or backward if too much burning is had. In Fig. 3 I show the housing 39 adapted to hold the photocells. It is preferably of circular shape, of substantial depth to completely and effectively house the photo cells, and of arcuate construction as to its periphery. Being of such construction the housing may be fitted into a holder 39A in the hood of the kiln. The housing position and the focusing position of the eyes may be determined by screw 46 effecting forward or backward motion. For circular positioning the desired angularity may be obtained by threaded shaft 47 working in blocks 48 and 48A. The threaded shaft has a threaded section 49 fitting into a corresponding curved and threaded area 50 running partly circularly about the holder 39A. Through these two positioning devices I can obtain and adjust the cell housing to any desired angularity.

As will be readily appreciated by those familiar with the art of cement manufacture the pressure drop or resistance through a kiln, such as indicated at 1, may increase due to the formation of "rings." Such increase in resistance would, with the apparatus I have so far described, effect an increase in the rate of fuel flow to the kiln notwithstanding that there had been no actual increase in the rate of air flow through the kiln, but actually a slight decrease due to the increase in resistance. To prevent such improper operation I provide suitable means for interlocking kiln speed with the rate of fuel supply so that if the increase in pressure drop is not due to an increase in air flow through the kiln an increase in the rate of fuel feed cannot be made. Correspondingly if a decrease in the pressure differential across the kiln is not due to a decrease in the rate of air flow, the interlock operates to prevent a decrease in fuel flow corresponding to the decrease in air flow.

Referring to Fig. 1, I therein show an electric tachometer comprising a transmitter 51 and a receiver 54. The transmitter 51 is rotated at a speed proportional to the speed of the kiln 1 and the receiver 54 likewise rotates at a speed proportional to that of the kiln. The receiver 54 rotates a cup 55 containing a liquid, such as mercury, on which floats a similarly shaped disc or member 56. The elevation of the disc 56 with respect to the cup 55 will depend upon the speed at which the latter is rotated, due to the centrifugal action increasing the height of the liquid in the outer section of the cup with increases in speed. The member 56 acts to position a contact lever 59 through a pin 57.

Also acting on the lever 59 is a pressure differential sensitive device comprising a diaphragm 58 responsive to the differential produced by the orifice 8, and hence producing a force acting downwardly on the lever 59 proportional to the rate of fuel flow to the kiln 1. So long as the forces produced by the disk 56 and diaphragm 58 are equal, contact 60 carried by the lever 59 is in the neutral position. When however the force produced by the diaphragm 58 predominates over that produced by the disc 56 then contact 60 engages a contact 62 and conversely when the force produced by the disc 56 predominates over that produced by the diaphragm 58 the contact 60 engages a contact 61. Engagement of contacts 60—62 energizes solenoid 64 so that switch 65 is moved to an open position, thereby preventing operation of the motor 28 in a direction to increase the rate of flow of primary air, and hence of rate of fuel flow to the kiln 1. Conversely, engagement of contacts 60—61 energizes a solenoid 63, which opens switch 66, and thereby prevents operation of motor 28 in a direction to decrease the rate of flow of primary air, and accordingly of fuel to the kiln 1.

I have found that if an increase in differential across a kiln is due to an increase in resistance because of the formation of "rings" for example, that a shorter flame results for a given rate of fuel input. Conversely, upon a decrease in differential due to a decrease in resistance of the kiln 1 the flame from the burner 3 is lengthened. Shortening of the flame causes the burning zone to be proportionately shortened, which through the photoelectric devices 35, 36 and 37 in manner heretofore described acts to slow down the kiln 1. Conversely, lengthening of the flame and a consequent lengthening of the burning zone acts to speed up the kiln 1. Such changes in speed of the kiln 1 act through the electric tachometer 51, 52 and disc 56 to bring contact 60 into engagement with contact 61 or 62 selectively in accordance with the sense of the change in kiln speed. Thus upon the kiln speed decreasing contact 60 will engage contact 62, and upon the kiln speed increasing contact 60 will engage contact 61.

As an increase in differential across the kiln, caused by an increase in resistance rather than an increase in flow, acts to shorten the flame from the burner 3, thereby slowing down the kiln, and consequently causing contact 60 to engage contact 62, it will be evident that the motor 28 cannot then be operated in a direction to increase the rate of flow of primary air. Thus even though otherwise the increase in differential pressure acting upon the diaphragm 24 would by virtue of engagement of contacts 26—29 act to increase the flow of primary air and consequently of fuel flow, such incorrect operation will be inhibited. Likewise upon a change in the differential across the kiln occurring because of a decrease in resistance of the kiln rather than a decrease in flow, operation of the motor 28 in a direction to decrease the flow of primary air will be prohibited because of the engagement of contact 60 with contact 61. It will be apparent therefore that the interlock mechanism described acts to prevent improper operation of the device 23A due to a fictitious change in the pressure differenttial across the kiln 1, which is not caused by a change in the rate of gas flow therethrough.

Under ordinary operating conditions, when for example, an actual increase in air flow through the kiln 1 occurs, the controller 23A acts, as heretofore described, to increase the rate of fuel flow proportionately. To prevent the increased differential produced by the orifice 8, incident to the increase in fuel flow, from effecting premature closure of the contacts 60—62 suitable time delay devices, such as the adjustable throttling valves 52, 53, may be located in the pressure transmitting pipes to the diaphragm 58. Before the increase in differential pressure produced by the orifice 8 becomes effective on the diaphragm 58, the length of the burning zone will increase, by virtue of the increased fuel feed, causing the speed of the kiln 1 and the force acting upwardly on the diaphragm 58 to increase. Upon an actual decrease in the rate of air flow through the kiln the throttling valves 52, 53 will prevent a decrease in the differential effective on the diaphragm 58 until after the resulting decrease in fuel feed has caused the length of the burning zone and the speed of the kiln to decrease.

In Fig. 4 I show a modified form of my invention wherein I employ a single radiation pyrometer, comprising a photoelectric device 70, rather than a plurality of devices as shown in Fig. 1. In the embodiment of my invention shown in Fig. 4 the speed of the kiln 1 is maintained proportional to the temperature of the material in the kiln at the spot on which the device 70 is focused. The photoelectric device 70 is focused on a spot in the burning zone of the kiln, the temperature of which decreases as the flame moves away from the hood; and increases as the flame moves toward the hood.

If the resistance through the kiln increases due to the formation of rings for example, or an increase in load, the temperature of the spot on which the photoelectric device 70 is focused will increase, causing a proportionate increase in speed of the kiln 1. The force acting upwardly on the diaphragm 58 will increase, causing contacts 60—61 to engage, energizing solenoid 63A and causing closure of normally open switch member 66A. Closure of switch 66A will permit reductions in fuel to be made. The increase in fuel flow which would otherwise occur, however, because of the increase in resistance through the kiln 1 is prevented because of switch member 65A which remains in its normally open position. Conversely if for some reason the resistance through the kiln 1 decreases, the temperature of the spot on which the photoelectric device 70 is focused will decrease, causing a proportionate decrease in speed of the kiln 1 and preventing the reduction in fuel flow which would otherwise occur by virtue of the decrease in differential pressure across the kiln.

In ordinary operation, assuming for example, that the air flow through the kiln is increased by adjustment of the damper 21, then the flame will move away from the hood of the kiln, causing the temperature of the spot on which the photoelectric device 70 is focused to decrease. The resulting decrease in speed of the kiln will cause closure of switch member 65A, thereby permitting the fuel to be increased proportionately to the increase in air flow. Upon an actual decrease in air flow through the kiln the consequent increase in kiln speed will cause closure of switch 66A and permit the rate of fuel flow to be decreased. It will therefore be observed that in the embodiment of my invention shown in Fig. 4, as well as in that shown in Fig. 1, a predetermined ratio is maintained between air flow and fuel flow and temporary upsets in the ratio which would otherwise occur due to variations in the resistance of the kiln are prevented.

In Fig. 4 the speed of the kiln 1 is maintained proportional to the temperature of the spot on which the photoelectric device 70 is focused by means of an electrodynamic balance generally indicated at 71. By means of an amplifier diagrammatically illustrated at 72 a current is produced proportional to the temperature of the spot on which the photoelectric device 70 is focused, and which energizes the coils 73 of the balance. A force is produced by the coils 73 proportional to the current which tends to turn a fulcrumed beam 74 in one direction. Acting in opposition is a force proportional to the current produced by the tachometer 51 which energizes the coils 75 of the balance. So long as these forces stand in predetermined ratio the beam 75 remains in neutral position. Unbalance of the forces causes the beam 74 to engage either contact 76 or 77 causing rotation of a reversing motor 78 to vary the speed of motor 45 in proper direction to restore the beam to balanced condition. In general, therefore, it is evident that the apparatus operates to maintain a predetermined ratio between the temperature of the spot on which the photoelectric device 70 is focused and the speed of the kiln.

Figure 5:
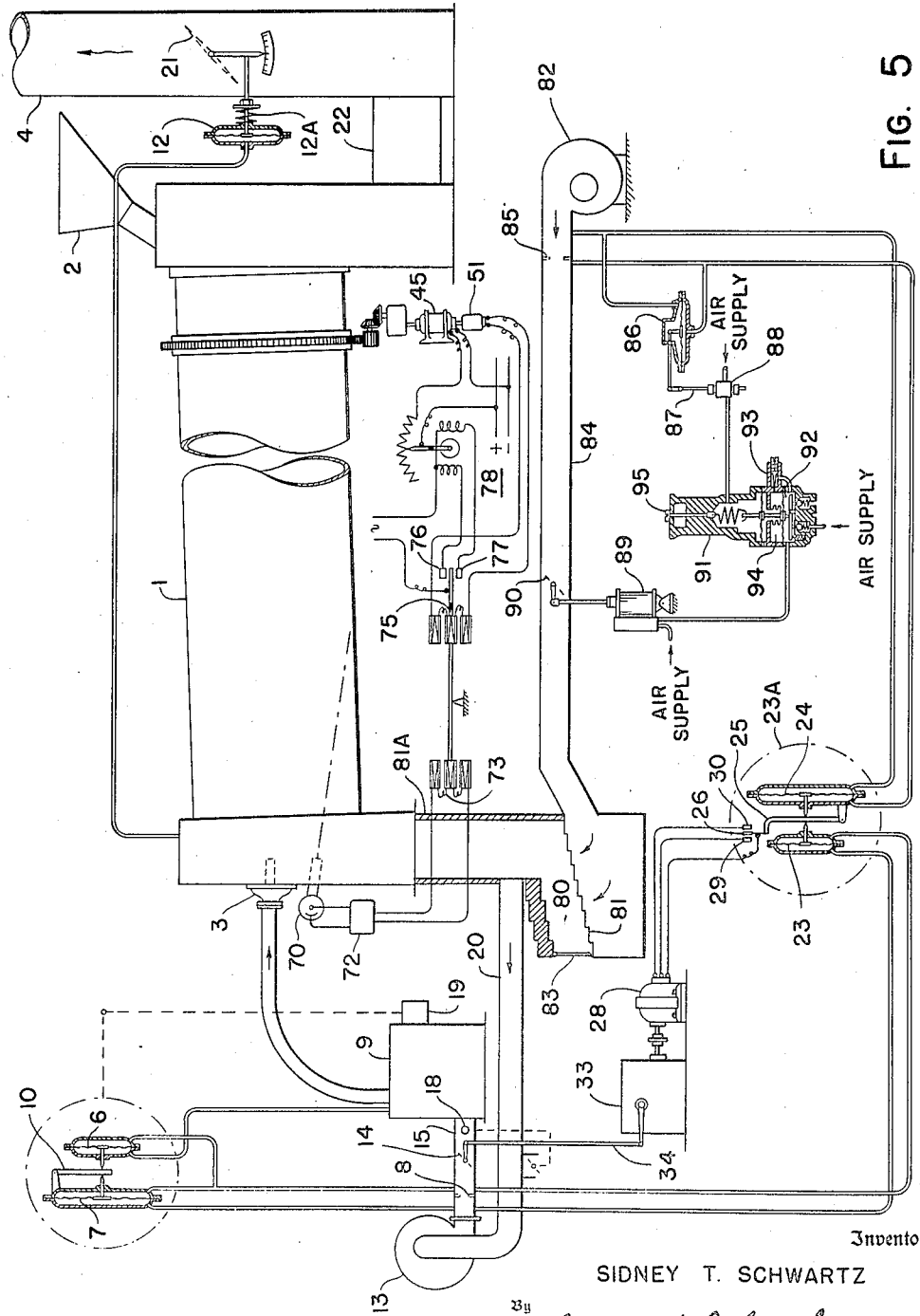

In Figs. 5 and 6 I show modified forms of my invention which are particularly applicable to kilns provided with forced draft, although it is evident that the forms of my invention illustrated in Figs. 1 and 4 may also be employed with such kilns. When, however, substantially all of the air for combustion is supplied by forced draft I prefer to use either the form of my invention shown in Fig. 5 or Fig. 6 for the reason that the means of measuring the air for combustion which I therein employ is unaffected by changes in kiln resistance, and accordingly I may dispense with the interlock included in the forms of my invention illustrated in Figs. 1 and 4.

Referring now to Fig. 5, the cement clinker is discharged from the kiln 1 into a cooler 80 provided with a perforated shaking or traveling grate 81 through which cooling air is blown by means of a fan 82. The clinker is discharged from the cooler 80 through a swinging gate or door 83.

The air after passing through the cooler 80 provides a convenient source of heated primary and secondary air for combustion. Accordingly, secondary air for combustion is drawn from the cooler 80 through a duct 81A. Likewise primary air is drawn by the fan 13 from the cooler 80 through the duct 20. In the embodiment of my invention shown in Fig. 5, as well as in Fig. 6, all of the air supplied by the fan 82 is used to cool the clinker and then used either as primary or secondary air for supporting combustion within the kiln 1. It will be evident, however, that if further cooling air is required a second section may be added to the cooler 80 supplied with air from a second fan, or any other suitable arrangement might be employed as will be readily understood by those familiar with the art.

The fan 82 is shown as being connected with the cooler 80 by a duct 84 in which is positioned a restriction, such as an orifice 85, producing a differential pressure varying in functional relation with the rate of air flow. Inasmuch as all of the air passing through the duct 84 is used for combustion a measure of the differential pressure produced by the orifice 85 affords a convenient means of determining the rate of air supply for combustion.

The differential pressure produced by the orifice 85 is impressed upon the diaphragm 24 of the ratio controller 23A. An increase in air flow through the duct 84, for example, will position the fulcrumed member 25 to the left as shown in the drawing, so that contact 26 will engage contact 29, thereby causing the damper 14 to be positioned in an opening direction, increasing the rate of primary air flow to the pulverizer 9 and the rate of fuel feed to the kiln 1. When the increase in primary air flow, or in other words when the increase in rate of fuel feed is proportional to the increase in rate of air supply, the differential pressure produced by the orifice 8 will increase sufficiently to restore the fulcrumed member 25 to the neutral position. Thus it will be observed that the apparatus will at all times operate to maintain a predetermined ratio between the rate at which air is supplied for combustion and the rate at which fuel is supplied.

It is usually desirable to maintain the rate at which air is supplied the kiln constant, for if the rate of fuel flow is maintained in predetermined ratio to the rate of air flow, it follows that a substantially constant heat release will be maintained in the kiln 1 which will materially stabilize conditions, resulting in a more uniform and higher quality clinker. Accordingly, I illustrate in the form of my invention shown in Fig. 5 apparatus for maintaining a constant rate of air supply for combustion. Conveniently the apparatus is provided with a manually adjustable means as will hereinafter be described, so that an operator or kiln attendant may adjust the control to maintain any desired rate of air and fuel supply.

Referring now to Fig. 5, the differential produced by the orifice 85 is transmitted to a differential pressure responsive device 86 which serves to position the movable valve member 87 of a pneumatic pilot valve 88, which is illustrated as being of the type described in U. S. Patent No. 2,054,464 to Clarence Johnson, to which reference may be made for a more detailed description. The pilot valve 88 serves to establish a pneumatic loading pressure corresponding to the rate of air flow through the duct 85. The loading pressure established by the pneumatic pilot valve 88 may be transmitted directly to a servo-motor 89 positioning a damper 90 controlling the rate of air flow through the duct 84. However, I usually prefer to have the loading pressure established by the pilot valve 88 first transmitted to a standardizing relay 91, which may be of the type described in U. S. Patent No. 2,098,914 to Harvard H. Gorrie.

The purpose of the standardizing relay 91 is to maintain the rate of air flow through the duct 84 precisely at the desired value without overshooting or hunting. In general, it may be said that the standardizing relay 91 acts to establish a control pressure which is transmitted to the servo-motor 89 varying in direct proportion to changes in the rate of air flow through the duct 84 and continuously in accordance with the difference between the actual rate of air flow through the duct 84 and that desired. Assuming, for example, that the rate of air flow through the duct 84 increases, an immediate and proportional change in the loading pressure established by the pilot valve 88 will occur. The standardizing relay 91 will produce an immediate and proportional change in the control pressure within a chamber 92 which is transmitted to the servo-motor 89 and serves to position the damper 90 an amount corresponding to the change in rate of air flow. Thereafter by virtue of the bleed passage 93 and chamber 94 the standardizing relay will act to produce a continuing change in the control pressure within the chamber 92 and transmitted to the servo-motor 89 at a rate corresponding to the difference between the actual rate of air flow through the duct 84 and that desired. The control pressure within the chamber 92 will continue to change until the rate of air flow through the duct 84 is restored to the desired value.

Any desired rate of air flow may be maintained through the duct 84 by manual manipulation of a screw 95 which varies the spring loading effective on the diaphragms within the standardizing relay 91. Accordingly, an operator may by manipulation of the screw 95 adjust the control to maintain any desired rate of air flow through the duct 84, and accordingly rate of heat release within the kiln 1.

The draft within the hood of the kiln 1 is preferably maintained constant at some predetermined value as explained with reference to the embodiment of my invention shown in Fig. 1. Likewise in the embodiment of my invention shown in Fig. 5 I may employ the kiln speed control mechanism shown either in the embodiment of my invention illustrated in Fig. 1 or in Fig. 4. By way of example I have shown in Fig. 5 the kiln speed control illustrated in Fig. 4. Accordingly, in the embodiment of my invention shown in Fig. 5 the kiln speed will be maintained proportional to the temperature of the material at the spot on which the photoelectric device 70 is focused.

In Fig. 6 I illustrate an embodiment of my invention similar in general aspects to that shown in Fig. 5, but differing therefrom in that the rate of air flow through the duct 84 is controlled to maintain a predetermined draft within the hood of the kiln 1. I prefer to use the form of my invention shown in Fig. 6 when the draft available at the stack 4 is limited so that there is a possibility that more forced draft air may be supplied for combusion than can be discharged through the stack 4. Such a possibility is avoided in the form of my invention shown in Fig. 6, for the air for combustion supplied by the forced draft fan 82 is controlled to maintain a predetermined draft in the hood of the kiln. The rate of air flow through the kiln may be manually adjusted by positioning the damper 21 in the stack 4.

Assume for example that it is desired to increase the rate of air flow through the kiln 1, and correspondingly the rate of fuel feed, the operator would position the damper 21 in an opening direction an amount corresponding to the desired increase. Such change in position of the damper 21 would cause a corresponding increase in the draft within the hood of the kiln which would operate, through a diaphragm servo-motor 12B, to position the damper 90A in an opening direction until the draft within the hood was restored to the desired value. As explained with reference to Fig. 5 a change in the rate of air supply for combustion through the duct 84 causes a corresponding change in the rate of fuel feed by virtue of the controller 23A.

While I have illustrated and described certain preferred forms of my invention I desire it to be understood that I am not to be limited thereto other than as claimed.

What I claim as new, and desire to secure by Letters Patent of the United States, is:

1. The combination with a kiln for heating a material, means for supplying fuel and air to the kiln to maintain combustion therein, means for determining the rate of air supply, means for determining the rate of fuel supply, and means under the joint control of said last two named means for controlling the rate of fuel supply.

2. The combination with a kiln for heating a material, means for supplying fuel and air to the kiln to maintain combustion therein, means for determining the ratio between the rates of fuel and air supply, and means under the control of said last named means for varying the rate of fuel supply to maintain a predetermined ratio between the rates of fuel and air supply.

3. In combination with a rotary kiln for heating a material, an air-swept pulverizer for supplying pulverized fuel suspended in air to the kiln, means for measuring the rate of air flow to the pulverizer, means for measuring the rate at which air is supplied for combustion, and means under the joint control for said last two named means for regulating the rate of air flow to the pulverizer.

4. In combination with a rotary kiln for heating a material, an air-swept pulverizer for supplying pulverized fuel suspended in air to the kiln, means for measuring the rate at which air is supplied for combustion, and means under the control of said last named means for regulating the rate at which air is passed through the pulverizer.

5. The combination with a rotary kiln for heating a material, means for supplying fuel and air to the kiln, means for determining the draft loss through said kiln, means responsive to said last named means for adjusting the rate of fuel supply in accordance with changes in the draft loss, and means for inhibiting the operation of said last named means when the change in draft loss is due to a change in the resistance of the kiln.

6. The combination with a rotary kiln for burning cement clinker, means for supplying fuel and air to the kiln to maintain combustion therein, means for determining the draft loss through said kiln, means responsive to said last named means for adjusting the rate of fuel supply in correspondence with changes in the draft loss, and means for limiting the extent of such adjustment in accordance with the length of the burning zone in said kiln.

7. The combination with a rotary kiln for burning cement clinker, means for supplying fuel and air to the kiln to maintain combustion therein, means for determining the draft loss through said kiln, means responsive to said last named means for adjusting the rate of fuel supply in correspondence with changes in the draft loss, means for determining the temperature of the clinker in a predetermined part of said kiln, and means responsive to said last named means for limiting operation of said adjusting means in accordance with changes in temperature of the clinker within the predetermined part of the kiln.

8. The combination with a rotary kiln for burning cement clinker, means for supplying fuel and air to the kiln to maintain combustion therein, means for determining the draft loss through said kiln, means responsive to said last named means for adjusting the rate of fuel supply in correspondence with changes in the draft loss through the kiln, means for determining the temperature of the clinker at a plurality of spots in said kiln, and means for limiting the adjustment of the rate of fuel supply in accordance with the number of said spots which are below a predetermined temperature.

9. The combination with a rotary kiln for burning cement clinker, means for supplying fuel and air to the kiln to maintain combustion therein, means for determining the draft loss through said kiln, means responsive to said last named means for adjusting the rate of fuel supply in correspondence with changes in the draft loss through the kiln, a plurality of photoelectric devices each focused to receive light from a selected spot in said kiln, and means under the control of said photoelectric devices for limiting the adjustment of the rate of fuel supply by said draft responsive means.

10. The combination with a rotary kiln for burning cement clinker, means for supplying fuel and air to the kiln to maintain combustion therein, means for determining the draft loss through said kiln, means responsive to said last named means for adjusting the rate of fuel supply in correspondence with changes in the draft loss, means for determining the temperature of the clinker at a spot in said kiln, and means limiting the adjustment of the rate of fuel supply in accordance with the temperature of said spot.

11. The combination with a rotary kiln for burning cement clinker, means for determining the length of the burning zone of the material in said kiln, and means controlled by said last named means for rotating the kiln.

12. The combination with a rotatable kiln for burning cement clinker of means for determining the temperature of the material at a plurality of separate spots within a predetermined zone of said kiln, and means selectively controlled by said last named means for rotating the kiln.

13. The combination with a rotatable cement kiln of means for determining the temperature of the material burning in the kiln at a plurality of spots, and means for rotating said kiln at a speed corresponding to the number of spots above a predetermined temperature.

14. The combination with a rotatable cement kiln, means for supplying fuel to the kiln to maintain combustion therein, temperature responsive means for determining the temperature of the material at a predetermined spot in the kiln, and means controlled by said last named means for limiting the maximum rate at which fuel may be supplied by said first named means in inverse proportion to the temperature of said spot.

15. The combination with a rotatable cement kiln, means for supplying fuel to the kiln to maintain combustion therein, means for determining the length of the burning zone in said kiln, and means controlled by said last named means limiting the maximum rate at which fuel may be supplied by said first named means in direct proportion to the length of the burning zone.

16. The combination with a rotatable cement kiln, means for supplying the elements of combustion to the kiln to maintain combustion therein, normally operative means for maintaining a predetermined ratio between the rates of supply of the elements of combustion, a light sensitive element focused upon the material burning in the kiln, means controlled by said element for rotating the kiln, and means for limiting the rate of supply of an element of combustion in accordance with the rate of rotation of the kiln.

17. The combination with a rotary kiln for heating a material, means for supplying fuel and air to the kiln, means for determining the rate of air flow through the kiln, means responsive to said last named means for adjusting the rate of fuel supply in accordance with changes in the rate of air flow, and means for limiting the extent of such adjustment in accordance with the length of the burning zone in said kiln.

18. The combination with a rotary kiln for heating a material, means for supplying fuel and air to the kiln, means for determining the rate of air flow through the kiln, means responsive to said last named means for adjusting the rate of fuel supply in accordance with changes in the rate of air flow, and means for limiting the extent of such adjustment in accordance with the speed of rotation of said kiln.

19. The combination with a rotary kiln for burning cement clinker, means for supplying fuel and air to the kiln to maintain combustion therein, means for determining the draft loss through said kiln, and means responsive to said last named means for adjusting the rate of fuel supply in correspondence with changes in the draft loss.

20. In combination with a rotary kiln for heating a material, an air-swept pulverizer for supplying pulverized fuel suspended in air to the kiln, means for supplying fuel to the pulverizer, means for measuring the rate of air flow to the pulverizer, means for measuring the differential pressure across a predetermined portion of said pulverizer, means under the joint control of said last two named means for regulating the rate at which fuel is supplied the pulverizer, means for measuring the rate at which air is supplied for combustion, and means under the joint control of said second named means and said means for measuring the rate at which air is supplied for combustion for regulating the rate of air flow to the pulverizer.

21. In combination with a rotary kiln for heating a material, an air-swept pulverizer for supplying pulverized fuel suspended in air to the kiln, means for regulating the rate at which fuel is supplied the pulverizer to maintain a predetermined ratio between the rates at which air is supplied the pulverizer and the quantity of fuel in the pulverizer, and means for regulating the rate of air flow to the pulverizer to maintain a predetermined ratio between the rate at which air is supplied the kiln for combustion and the rate of air flow to the pulverizer.

22. In combination with a rotary kiln for heating a material having a hood at one end to which fuel and air are admitted and an exhaust flue for the gases of combustion at the other end, means for supplying fuel to the hood of said kiln, means for supplying air to the hood for supporting combustion, means for maintaining a constant rate of air flow to the hood, means for maintaining a predetermined ratio between the rate of air flow and fuel flow to the kiln, and means for regulating the flow of gases through said exhaust flue to maintain a predetermined draft in the hood of said kiln.

23. In combination with a rotary kiln for heating a material having a hood at one end to which fuel and air are admitted and an exhaust flue for the gases of combustion at the other end, means for supplying fuel to the hood of said kiln, means for supplying air to the hood for supporting combustion, means for maintaining a constant rate of air flow to the hood, and means for regulating the flow of gases through said exhaust flue to maintain a predetermined draft in the hood of said kiln.

24. In combustion with a rotary kiln for heating a material having a hood at one end to which fuel and air are admitted and an exhaust flue for the gases of combustion at the other end, means for supplying fuel to the hood of said kiln, means for supplying air to the hood for supporting combustion, means for maintaining a constant rate of air flow to the hood, means for regulating the flow of gases through said exhaust flue to maintain a predetermined draft in the hood of said kiln, means for determining the length of the burning zone in said kiln, and means under the control of said last named means for regulating the speed of rotation of said kiln.

25. In combination with a rotary kiln for heating a material having a hood at one end to which fuel and air are admitted and an exhaust flue for the gases of combustion at the other end, means for supplying fuel to the hood of said kiln, a duct for supplying air to the hood of said kiln for supporting combustion, means for regulating the rate of air flow through said duct, and means responsive to the draft in the hood of said kiln for controlling said last named means.

26. In combination with a rotary kiln for heating a material, an air swept pulverizer for supplying pulverized fuel suspended in air to the kiln, means for supplying fuel to the pulverizer, means for measuring the rate of air flow to the pulverizer, means for measuring the differential pressure across a predetermined portion of said pulverizer, means under the joint control of said last two named means for regulating the rate at which fuel is supplied the pulverizer, means for determining the temperature of the material in a predetermined part of said kiln, and means responsive to said last named means for regulating the rate of air flow to said pulverizer and thereby the rate at which fuel is supplied to said kiln.

SIDNEY T. SCHWARTZ.